(12) United States Patent
Fujiwara

(10) Patent No.: US 12,021,808 B2
(45) Date of Patent: Jun. 25, 2024

(54) MAIL-RELAYING DEVICE, MAIL-RELAYING METHOD, AND MAIL-RELAYING PROGRAM

(71) Applicant: NEC Corporation, Tokyo (JP)

(72) Inventor: Asuka Fujiwara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/792,909

(22) PCT Filed: Nov. 6, 2020

(86) PCT No.: PCT/JP2020/041486
§ 371 (c)(1),
(2) Date: Jul. 14, 2022

(87) PCT Pub. No.: WO2021/152950
PCT Pub. Date: Aug. 5, 2021

(65) Prior Publication Data
US 2023/0079917 A1 Mar. 16, 2023

(30) Foreign Application Priority Data
Jan. 30, 2020 (JP) ................. 2020-013730

(51) Int. Cl.
*H04L 51/21* (2022.01)
*H04L 51/00* (2022.01)
*H04L 51/48* (2022.01)
(52) U.S. Cl.
CPC .............. *H04L 51/21* (2022.05); *H04L 51/00* (2013.01); *H04L 51/48* (2022.05)

(58) Field of Classification Search
CPC ......... H04L 51/00; H04L 51/21; H04L 51/48; G06F 13/00
See application file for complete search history.

(56) References Cited

U.S. PATENT DOCUMENTS 7,627,641 B2 * 12/2009 Aslop ................... H04L 51/212
709/206
7,900,254 B1 * 3/2011 Fisher ................. G06Q 10/107
726/22

(Continued)

FOREIGN PATENT DOCUMENTS

JP 2001-134505 A 5/2001
JP 2001-217860 A 8/2001

(Continued)

OTHER PUBLICATIONS

International Search Report for PCT Application No. PCT/JP2020/041486, dated Jan. 19, 2021.

*Primary Examiner* — Rachel J Hackenberg

(57) ABSTRACT

The mail relay device 800 includes a determination unit 801 which determines whether or not a received fragment is the last fragment to be received when any of a plurality of fragments generated by splitting an e-mail is received from a transmitting device, a transmission unit 802 which transmits the fragment to a receiving device when the determination unit 801 determines that the received fragment is not a final fragment, and a merging unit 803 which merges all fragments forming the e-mail to reassemble e-mail when the determination unit 801 determines that the received fragment is the final fragment, wherein the transmission unit 802 transmits the final fragment to the transmitting device under the condition that the inspection unit 804 determines that the e-mail is normal.

8 Claims, 6 Drawing Sheets

(56) References Cited

U.S. PATENT DOCUMENTS

| | | | | |
|---|---|---|---|---|
| 8,443,447 B1* | 5/2013 | Chen | ............... | H04L 63/145 |
| | | | | 713/188 |
| 2007/0143406 A1* | 6/2007 | Collet | ............... | H04L 51/00 |
| | | | | 709/206 |
| 2012/0150967 A1* | 6/2012 | Cai | ............... | H04L 51/212 |
| | | | | 709/206 |
| 2014/0379553 A1* | 12/2014 | Hurd | ............... | H04L 47/56 |
| | | | | 705/37 |

FOREIGN PATENT DOCUMENTS

| | | | |
|---|---|---|---|
| JP | 2018-107486 A | | 7/2018 |
| JP | 2018107486 A | * | 7/2018 |
| JP | 2019159993 A | * | 9/2019 |

\* cited by examiner

FIG. 3

MANAGEMENT INFORMATION AND CONTENTS OF SPLIT MAIL (A)

| # | Message-ID | Total Number |
|---|---|---|
| 1 | oc=jpbe0M2Yt4s@thumper.bellcore.com | 3 |
| 2 | oc=next0X1234d@thumper.bellcore.com | 2 |

(B)

| # | Message-ID | Number | Content |
|---|---|---|---|
| 1 | oc=jpbe0M2Yt4s@thumper.bellcore.com | 1 | (CONTENTS OF FIRST FRAGMENT) |
| 2 | oc=jpbe0M2Yt4s@thumper.bellcore.com | 3 | (CONTENTS OF THIRD FRAGMENT) |
| 3 | oc=jpbe0M2Yt4s@thumper.bellcore.com | 2 | (CONTENTS OF SECOND FRAGMENT) |
| 4 | oc=next0X1234d@thumper.bellcore.com | 1 | (CONTENTS OF FIRST FRAGMENT) |

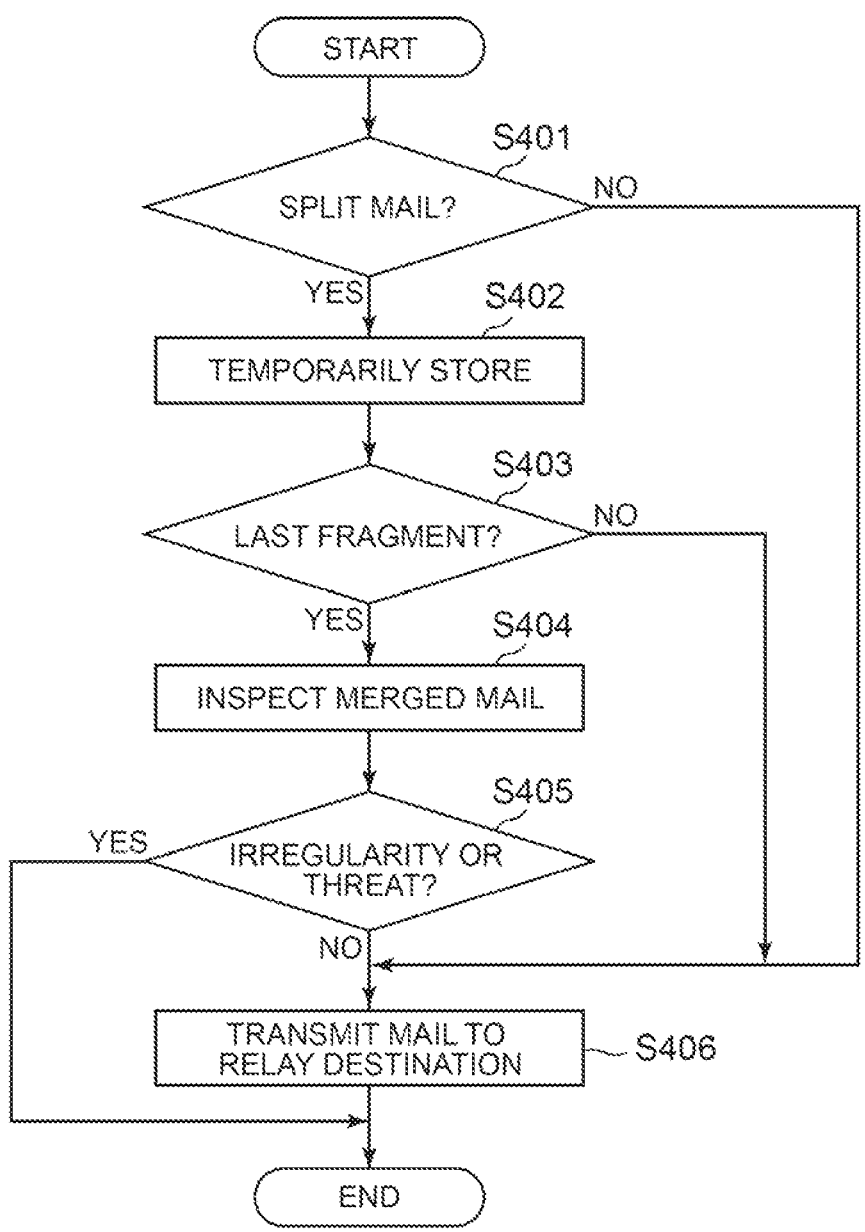

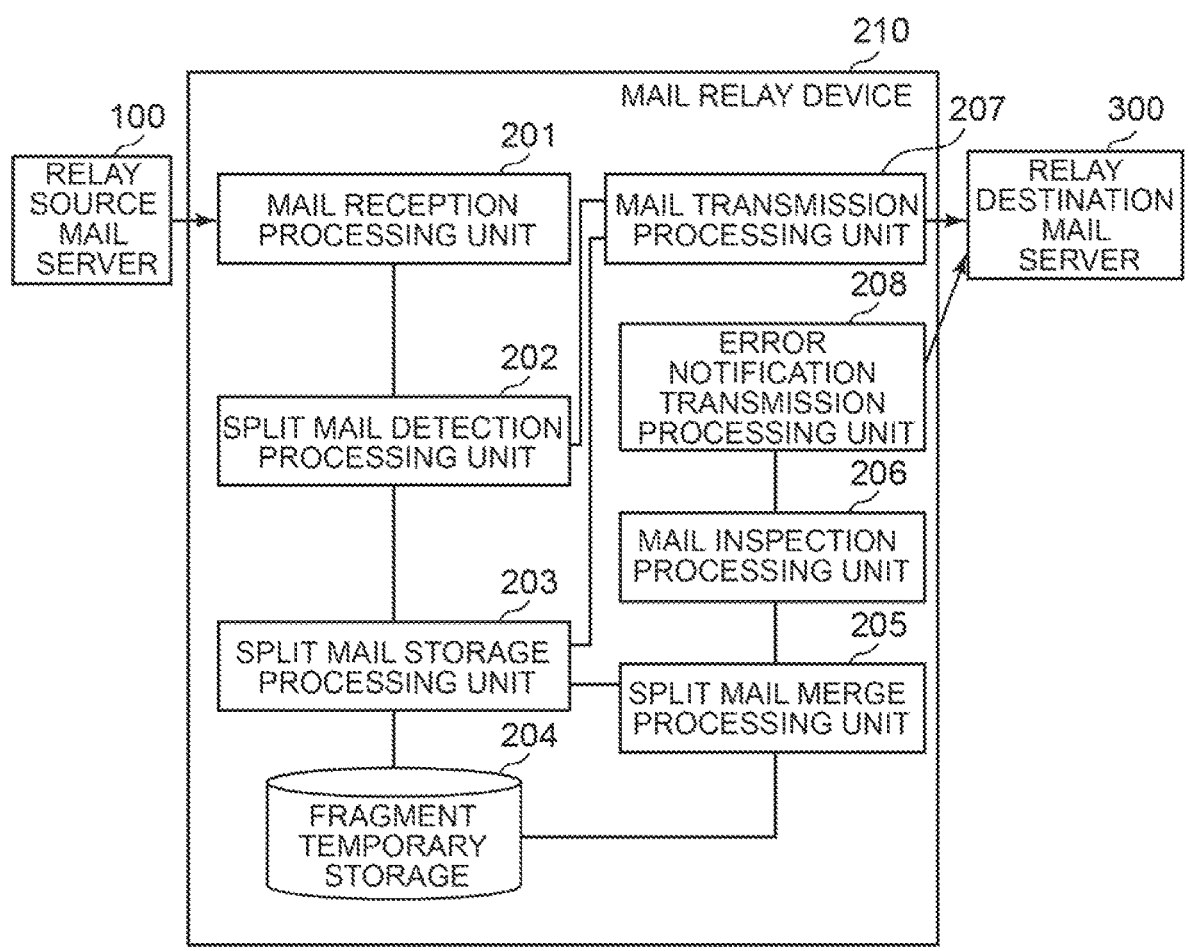

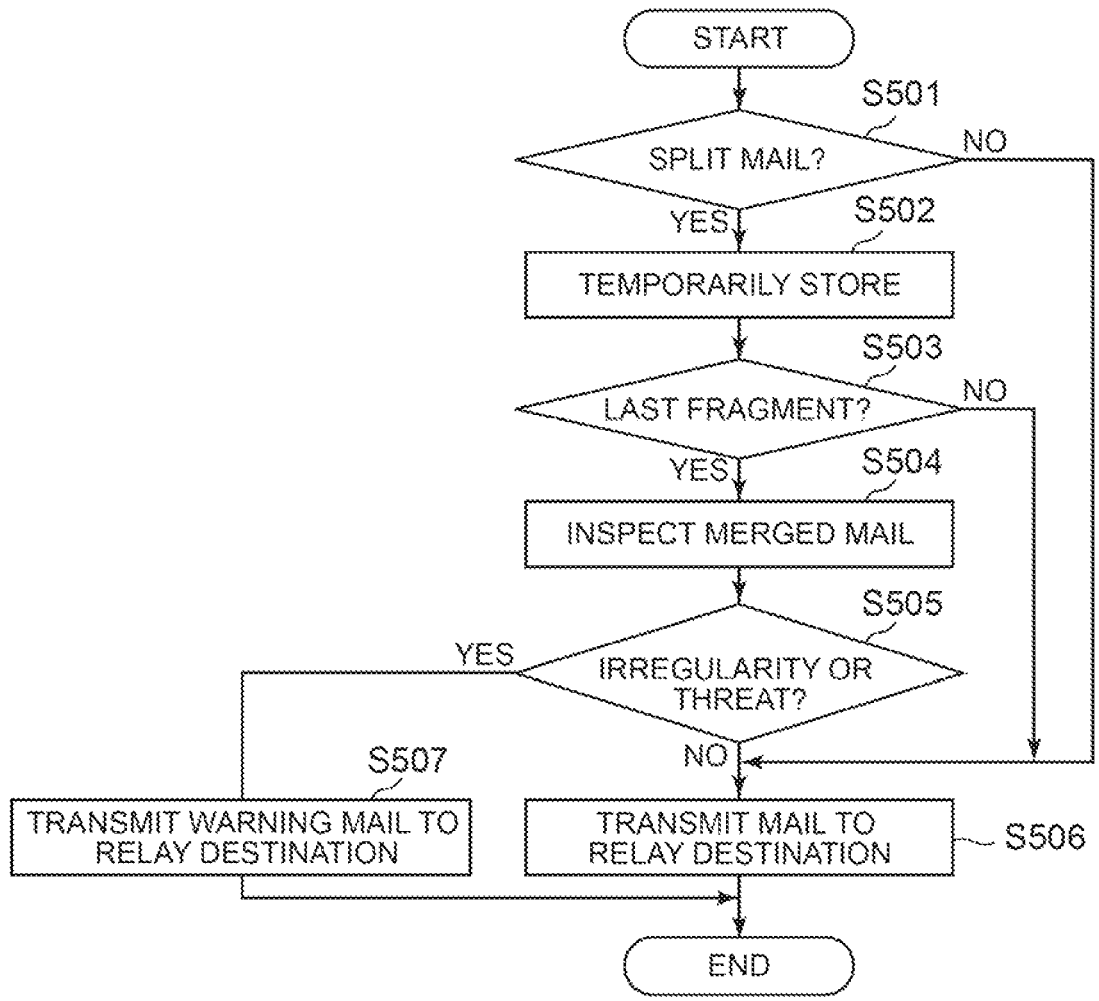

MAIL-RELAYING DEVICE, MAIL-RELAYING METHOD, AND MAIL-RELAYING PROGRAM

This application is a National Stage Entry of PCT/JP2020/041486 filed on Nov. 6, 2020, which claims priority from Japanese Patent Application 2020-013730 filed on Jan. 30, 2020, the contents of all of which are incorporated herein by reference, in their entirety.

TECHNICAL FIELD

This invention relates to a mail relay device, a mail relay method, and a mail relay program that relays electronic mails transmitted from a transmitting device to a receiving device.

BACKGROUND ART

When exchanging data other than text by an e-mail, the transmitting device encodes the e-mail in MIME (Multipurpose Internet Mail Extensions) format and transmits it. When the size of the e-mail is large, the transmitting device encodes the e-mail in MIME format. When the size of the e-mail is large, the transmitting device divides the e-mail and transmits multiple fragments as split mails when encoding the e-mail into MIME format. When the transmitting device transmits the e-mail in fragments, when a communication error occurs during transmission of the e-mail, the processing cost of retransmitting the e-mail is suppressed. In addition, by setting a limit on the size that can be transmitted at one time, the load on the devices and communication lines involved in transmitting and receiving e-mail is suppressed. The structure of a split mail is specified in RFC (Request For Comments) 2046, etc.

CITATION LIST

Patent Literature

PTL 1: Japanese Patent Laid-Open No. 2018-107486

SUMMARY OF INVENTION

Technical Problem

The following problems occur when a mail relay device that relays an e-mail transmitted and received between a transmitting device (for example, a relay source mail server) and a receiving device (for example, a relay destination mail server) transmits and receives a split mail. When a mail relay device judges legitimacy of received e-mail (judging whether or not it is spoofed e-mail or spam e-mail) or detects threats contained in the e-mail (detecting e-mail containing viruses or worms), when the e-mail is split, the judgment or detection may not be performed correctly. It is conceivable that a mail relay device may hold each fragment of an e-mail for virus checking or other inspection after merging split mails. However, the holding time of each fragment until the last fragment (final fragment) arrives is a delivery delay time of the e-mail. When a delivery delay time occurs, the fragments will not reach the receiving device during that time. In addition, there will be a period when the transmitting device does not receive any response, such as an error response. This may cause confusion to the e-mail sender and receiver.

Patent literature 1 describes an example in which each fragment of a split e-mail is merged when all the fragments are received, and the e-mail reassembled by merging is transmitted to the next stage.

The purpose of this invention is to provide a mail relay device, a mail relay method, and a mail relay program that can suppress delay in the delivery of an e-mail and improve effectiveness of e-mail inspection, etc.

Solution to Problem

The mail relay device according to the present invention includes determination means for determining whether or not a received fragment is the last fragment to be received when any of a plurality of fragments generated by splitting an e-mail is received from a transmitting device, transmission means for transmitting the fragment to a receiving device when the determination means determines that the received fragment is not a final fragment, merging means for merging all fragments forming the e-mail to reassemble e-mail when the determination means determines that the received fragment is the final fragment, and inspection means for inspecting the e-mail reassembled by the merging means, wherein the transmission means transmits the final fragment to the transmitting device under the condition that the inspection means determines that the e-mail is normal.

The mail relay method according to the present invention includes determining whether or not a received fragment is the last fragment to be received when any of a plurality of fragments generated by splitting an e-mail is received from a transmitting device, transmitting the fragment to a receiving device when determining that the received fragment is not a final fragment, merging all fragments forming the e-mail to reassemble e-mail when determining that the received fragment is the final fragment, and inspecting the reassembled e-mail, wherein the final fragment is transmitted to the transmitting device under the condition that the e-mail is determined to be normal.

The mail relay program according to the present invention causes a computer to execute a determination process of determining whether or not a received fragment is the last fragment to be received when any of a plurality of fragments generated by splitting an e-mail is received from a transmitting device, a transmission process of transmitting the fragment to a receiving device when determining that the received fragment is not a final fragment, a merging process of merging all fragments forming the e-mail to reassemble e-mail when determining that the received fragment is the final fragment, and an inspection process of inspecting the reassembled e-mail, wherein the final fragment is transmitted to the transmitting device in the transmission process under the condition that the e-mail is determined to be normal.

Advantageous Effects of Invention

According to the present invention, delay in the delivery of an e-mail is suppress and effectiveness of e-mail inspection, etc. is improved.

BRIEF DESCRIPTION OF DRAWINGS

FIG. 3 It depicts an example of a split mail and management information stored in the fragment temporary storage.

FIG. 4 It depicts a flowchart showing an operation example of the mail relay device of the first example embodiment.

FIG. 5 It depicts a block diagram showing a configuration example of a mail relay device of the second example embodiment.

FIG. 6 It depicts a flowchart showing an operation example of the mail relay device of the second example embodiment.

FIG. 7 It depicts an explanatory diagram showing a warning mail.

DESCRIPTION OF EMBODIMENTS

Example Embodiment 1

Figure 1:
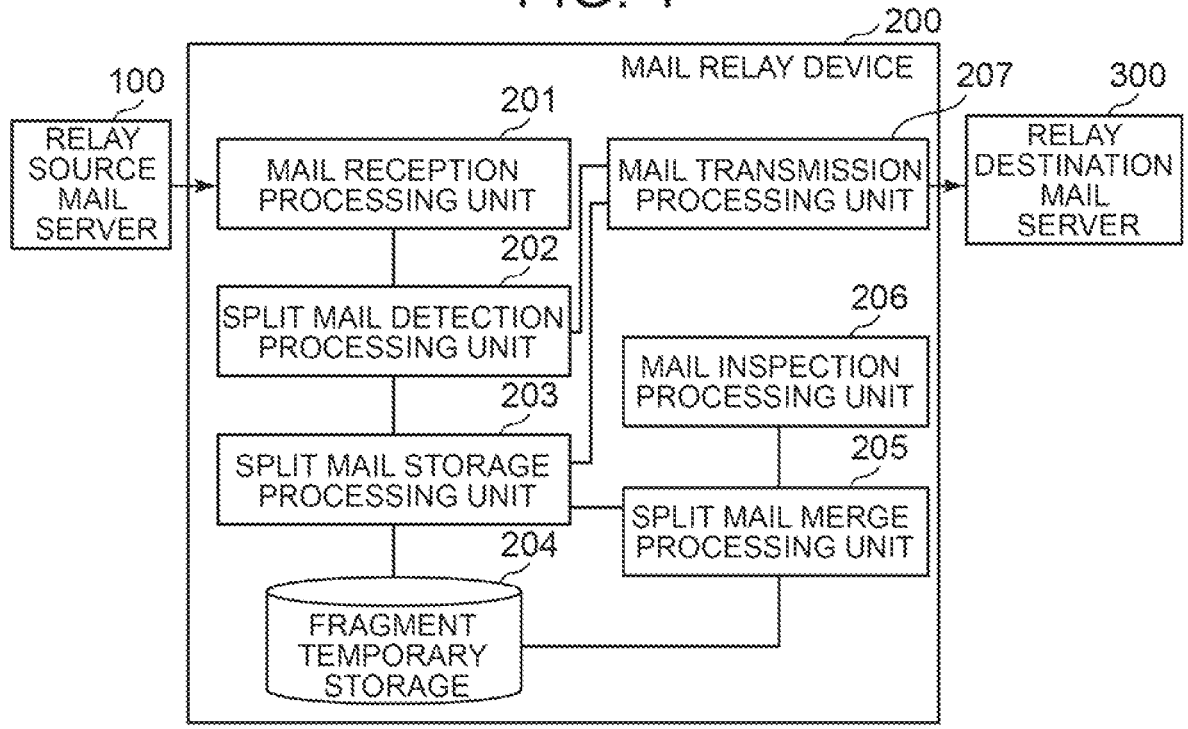
FIG. 1 It depicts a block diagram showing a configuration example of a mail relay device of the first example embodiment.

Hereinafter, the first example embodiment of the present invention is described with reference to the drawings. FIG. 1 is a block diagram showing an example of a mail relay device (an e-mail relay device) 200 of the first example embodiment, together with a relay source mail server (a relay source e-mail server) 100 that is an example of a transmitting device and a relay destination mail server (a relay destination e-mail server) 300 that is an example of a receiving device. The mail relay device 200 is used to relay messages transmitted and received between the relay source mail server 100 and the relay destination mail server 300. The mail relay device 200 relays e-mails transmitted and received between the relay source mail server 100 and the relay destination mail server 300. The mail relay device 200 includes a mail reception processing unit 201, a split mail detection processing unit 202, a split mail storage processing unit 203, a fragment temporary storage 204, a split mail merge processing unit 205, a mail inspection processing unit 206, and a mail transmission processing unit 207.

Figure 2:
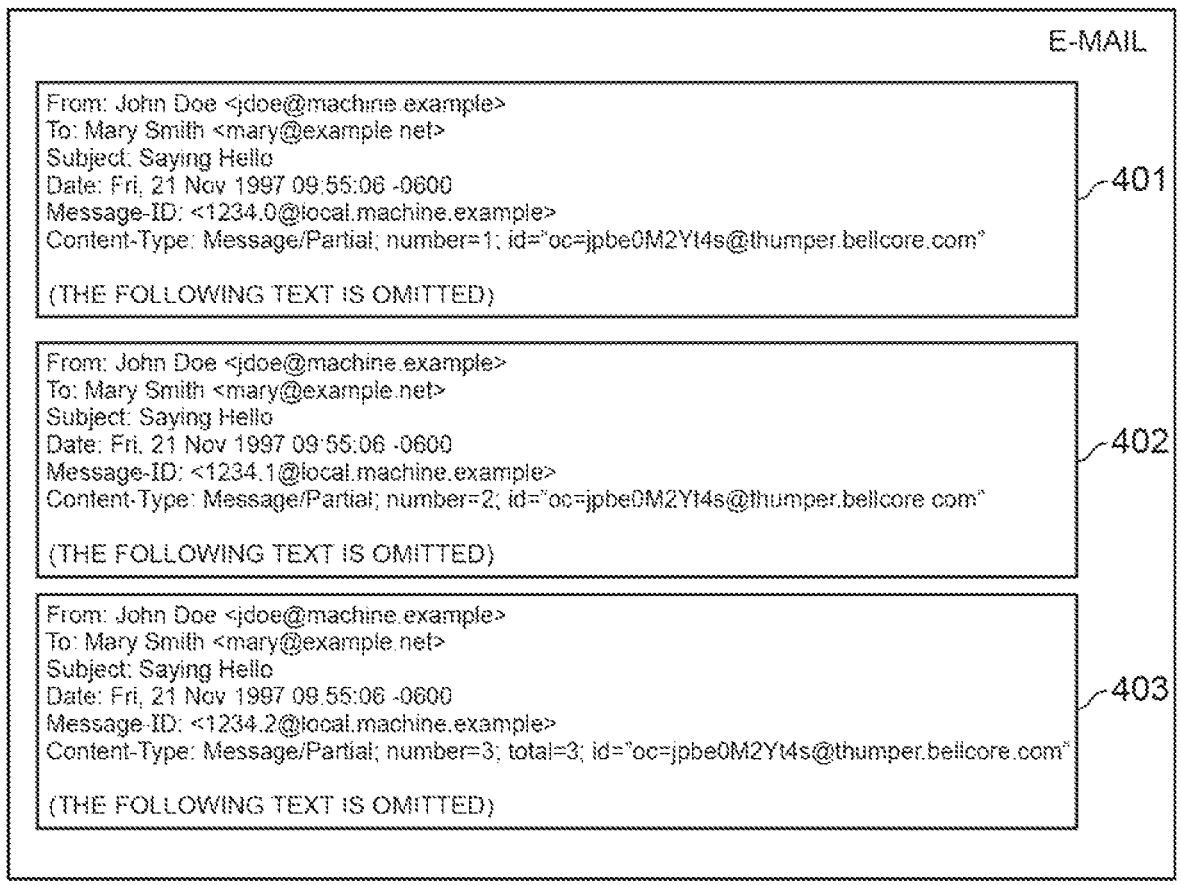
FIG. 2 It depicts an explanatory diagram showing an example of split mails.

FIG. 2 is an explanatory diagram showing an example of split mails. Hereafter, a fragment obtained by splitting one e-mail is also referred to as a split mail. FIG. 2 shows a split mail 401, a split mail 402 and a split e-mail 403. For example, when the size of the e-mail exceeds the size limit, the e-mail is split. In the example shown in FIG. 2, the e-mail is split into three split mails 401, 402, and 403. The split mail 402 is a subsequent fragment to the split mail 401. The split e-mail 403 is a subsequent fragment to the split e-mail 402.

The mail reception processing unit 201 performs the process of receiving electronic mail. The mail reception processing unit 201 receives e-mails from the relay source mail server 100 based on the SMTP (Simple Mail Transfer Protocol). The mail reception processing unit 201 outputs the received electronic mails to the split mail detection processing unit 202. Depending on the response from the split mail detection processing unit 202, the mail reception processing unit 201 responds, upon completion of e-mail reception, whether normal completion, temporary receipt rejection or permanent receipt rejection, to the relay source mail server 100.

Generally, the relay source mail server 100 transmits an e-mail to inform the sender of the e-mail that the e-mail was undeliverable when the mail relay server 100 receives a permanent rejection response from the mail relay device 200 after completing the transmission of an e-mail. When the relay source mail server 100 receives a temporary receipt rejection response from the mail relay device 200 after completing transmission of an e-mail, the relay source mail server 100 retransmits the e-mail after a certain period has elapsed. When the relay source mail server 100 receives a normal completion response, the relay source mail server 100 does not respond anything to the sender of the e-mail.

When the received e-mail is not a split mail, the split mail detection processing unit 202 outputs the received e-mail to the mail transmission processing unit 207 outputs the received e-mail to the mail transmission processing unit 207. The mail transmission processing unit 207 transmits the e-mail to the relay destination mail server 300. When the received e-mail is a split mail, the split mail detection processing unit 202 outputs the split mail to the split mail storage processing unit 203. When the response from the split mail storage processing unit 203 is a normal response, the split mail detection processing unit 202 notifies the mail reception processing unit 201 that it is normal.

The split mail storage processing unit 203 inputs a split mail from the split mail detection processing unit 202 and stores the split mail in the fragment temporary storage 204. The split mail storage processing unit 203 checks whether the inputted split mail is the final fragment or not. For example, when the e-mail is split into three fragments, the split mail storage processing unit 203 checks whether the e-mail is the third received fragment.

When the fragment is not the final fragment, the split mail storage processing unit 203 outputs the fragment (split mail) to the mail transmission processing unit 207. The mail transmission processing unit 207 transmits the split mail to the relay destination mail server 300. When the fragment is a final fragment, the split mail merge processing unit 205 executes merging process to merge the fragments, and then executes a process (for example, virus check process) after the merging process. When the split mail merge processing unit 205 determines that the e-mail (the e-mail generated by merging all fragments) is normal (for example, does not contain a virus), the split mail storage processing unit 203 outputs the final fragment to the mail transmission processing unit 207. In addition, the split mail storage processing unit 203 outputs a normal response to the split mail detection processing unit 202. When the split mail merge processing unit 205 determines that the e-mail is not normal in a subsequent process to the merging process, the split mail storage processing unit 203 does not output the final fragment to the mail transmission processing unit 207. Then, the split mail storage processing unit 203 outputs an abnormal response to the split mail detection processing unit 202.

The fragment temporary storage 204 temporarily stores a fragment input from the split mail storage processing unit 203. FIG. 3 is an example of a split mail and management information stored in the fragment temporary storage 204. As shown in FIG. 3, in addition to the content of the fragment (Content), a part of the header of the e-mail and the number of the fragment are stored in the fragment temporary storage 204 as management information. FIG. 3 shows an e-mail subject to the following explanation (each split e-mail whose Message ID is oc=jpbe0M2Yt4s@ thumper.bellcore.com) and another e-mail (whose Message ID is oc=next-0X1234d@thumperbellcore.com) are stored in the fragment temporary storage 204.

In the example shown in FIG. 3, the fragment temporary storage 204 stores as management information the total number of fragments (Total Number) which is keyed to the message ID (Message IDentification) of the split mail (refer to (A) in FIG. 3) and the serial number (Number) of each fragment (refer to (B) in FIG. 3) which is keyed to the message ID of the split mail.

The split mail merge processing unit 205 merges the fragments stored in the fragment temporary storage 204. Specifically, the split mail merge processing unit 205 merges all fragments that have the same Message ID in the order of the serial number. The fragment temporary storage 204 merges fragments in accordance with the standards of RFC 2046, for example. The mail inspection processing unit 206 inspects the e-mail obtained by the merging. For example, the mail inspection processing unit 206 determines whether the e-mail is an illegal e-mail. As an illegal e-mail, there is at least an e-mail that includes threat such as a virus. The mail inspection processing unit 206 notifies the result of the determination to the split mail merge processing unit 205. The split mail merge processing unit 205 notifies the split mail storage processing unit 203 of the determination result.

The mail transmission processing unit 207 transmits the e-mail input from the split mail detection processing unit 202 or the split mail input from the split mail storage processing unit 20 to the relay destination mail server 300.

Next, the operation of the mail relay device 200 is explained with reference to the flowchart of FIG. 4.

In the initial state, since any e-mail fragments are not received, the management information stored in the fragment temporary storage 204 as illustrated in (A) and (B) of FIG. 3, is empty. In the empty state, for example, each item in the management information is set to 0.

The following is an example of a case in which split mails 401, 402, 403 as illustrated in FIG. 2 are received in the mail relay device 200. The following is an example of a case in which split mails 401, 402, 403 are received at the mail relay device 200 as illustrated in FIG. 2. Since the order in which split mails 401, 402, 403 are received depends on the situation outside the device, the actual order in which the split messages 401, 402, 403 are received may not be the same as the serial number. However, in this example embodiment, the order in which split mails 401, 402, 403 are not received in the same order as their serial numbers, the process of merging split mails 401, 402, 403 are not received according to the serial number, the process of merging the 401, 402, and 403 is correctly executed. In the following example, each split mail is received in the order of split mail 401, split mail 403, split mail 40. In other words, the split mail 401 is received first, the split mail 403 is received second, and the split mail 402 is received third (last).

When the mail reception processing unit 201 receives an e-mail, the split mail detection processing unit 202 checks whether the received e-mail is a split mail or not (step S401). The split mail detection processing unit 202 determines that the e-mail is a split mail when the "Content-Type" header of the received e-mail includes "Message/Partial". In this example, since the split mail 401 (refer to FIG. 2) is received first, the split mail detection processing unit 202 determines that the e-mail is a split mail.

When the split mail detection processing unit 202 determines that the e-mail is a split mail, the split mail detection processing unit 202 outputs the split mail to the split mail storage processing unit 203. When the split mail detection processing unit 202 determines that the e-mail is not a split mail, the split mail detection processing unit 202 outputs the received e-mail to the mail transmission processing unit 207.

When the e-mail is determined to be a split mail, the split mail storage processing unit 203 records the value of "total" as "Total Number" in the fragment temporary storage 204 if "total" is present in the "Content-Type" header of the split mail. However, there is no "total" in the "Content-Type" header of the split mail 401 (refer to FIG. 2). Therefore, the "Total Number" is not recorded at this stage. At this stage, the value of "Total Number" remains empty (for example, 0).

In addition, the split mail storage processing unit 203 records the value of number (the serial number set in the header of the split mail) in the "Content-Type" header of the received split mail (in this example, the split mail 401) as "Number" in the fragment temporary storage 204, and stores contents of the split mail 401 in the fragment temporary storage 204 (refer to #1 in (B) of FIG. 3) (step S402).

Since the content of the split mail 401 are stored as a single record in the fragment temporary storage 204, hereinafter, the number of the column # in (B) of FIG. 3 is sometimes referred to as the record number. For example, the record number of #1 is 1.

The split mail storage processing unit 203 checks whether the received split mail 401 is the final fragment or not (step S403). For example, when the record number of the last stored split mail in the fragment temporary storage 204 matches the value of "Total Number", the split mail storage processing unit 203 determines received segmented e-mail is the final fragment. However, since the record number of split mail 401 is 1 in the fragment temporary storage 204, the record number does not match the value of "Total Number". Therefore, the split mail storage processing unit 203 determines that split mail 401 is not the final fragment.

When the received split mail (in this example, the split mail 401) is not the final fragment, the split mail storage processing unit 203 outputs the split mail 401 to the mail transmission processing unit 207. The mail transmission processing unit 207 transmits the split mail 401 to the relay destination mail server 300 (step S406). The split mail storage processing unit 203 outputs a normal response to the split mail detection processing unit 202. The split mail detection processing unit 202 notifies the mail reception processing unit 201 that it is normal.

When the mail reception processing unit 201 receives the next e-mail, the split mail detection processing unit 202 checks whether the received e-mail is a split mail or not (step S401). In this example, the split mail 403 is received. Since the "Content-Type" header of the split mail 403 includes "Message/Partial," the split mail detection processing unit 202 determines that the received e-mail is a split mail (step S402).

Since "total" is present in the "Content-Type" header of the split mail 403, the split mail storage processing unit 203 records the value of "total" as "Total Number" in the fragment temporary storage 204. Since the value of "total" is 3 (refer to FIG. 2), 3 is recorded in the "Total Number" at this stage.

In addition, the split mail storage processing unit 203 records the value of the number in the "Content-Type" header of the received split mail 403 as "Number" in the fragment temporary storage 204, and records the contents of the split mail 403 in the fragment temporary storage 204. (refer to #2 in (B) of FIG. 3) (step S402).

The split mail storage processing unit 203 checks whether or not the received split mail 403 is the final fragment (step S403). Since the record number of the split mail 403 is 2 in the fragment temporary storage 204, the record number does not match the value of "Total Number". Therefore, the split mail storage processing unit 203 determines that the split mail 403 is not the final fragment.

Since the received split mail 403 is not the final fragment, the split mail storage processing unit 203 outputs the split mail 403 to the mail transmission processing unit 207. The mail transmission processing unit 207 transmits the split mail 403 to the relay destination mail server 300 (step S406). The split mail storage processing unit 203 outputs a normal response to the split mail detection processing unit 202. The split mail detection processing unit 202 notifies the mail reception processing unit 201 that it is normal.

When the mail reception processing unit 201 receives the next e-mail, the split mail detection processing unit 202 checks whether the received e-mail is a split mail or not (step S401). In this example, the split mail 402 is received. Since the "Content-Type" header of the split mail 402 includes "Message/Partial", the split mail detection processing unit 202 determines that the received e-mail is a split mail (step S402).

In addition, the split mail storage processing unit 203 records the value of the number in the "Content-Type" header of the received split mail 402 as "Number" in the fragment temporary storage 204, and records the contents of the split mail 402 in the fragment temporary storage 204. Number" in the "Content-Type" header of the received 402 segmented mail and stores the contents of the 402 segmented mail in the fragment temporary storage 204 (refer to #3 in (B) of FIG. 3) (step S402).

The split mail storage processing unit 203 checks whether the received split mail 402 is the final fragment or not (step S403). Since the record number of the split mail 402 is 3 in the fragment temporary storage 204, the record number matches the "Total Number". Therefore, the split e-mail storage processing unit 203 determines that the split e-mail 402 is the final fragment.

When the split mail storage processing unit 203 confirms that the final fragment has been received, the split mail storage processing unit 203 notifies the split mail merge processing unit 205 of Message ID of the final fragment. The split mail merge processing 205 reads the contents of the split mail from the fragment temporary storage 204 using the Message ID as a key. In this example, the contents of #1 to #3 split e-mails are read out. The split mail merge processing unit 205 merges contents of the split mails according to the serial number (Number). In this example, the split mail is merged in the order of #401, #403, and #402. In this example, the split mails are merged in the order of the split mail 401, the split mail 403, and the split mail 402, to reassemble a single e-mail. The split mail merge processing unit 205 outputs the reassembled e-mail to the mail inspection processing unit 206. The mail inspection processing unit 206 inspects the e-mail (step S404).

When the result of the inspection by the mail inspection processing unit 206 is normal (no irregularity or threat is detected) (step S405), the split mail storage processing unit 203 outputs a normal response to the split mail detection processing unit 202. The split mail detection processing unit 202 notifies the mail reception processing unit 201 that it is normal. In addition, the split mail storage processing unit 203 outputs the final fragment (the split mail 402) to the mail transmission processing unit 207. The mail transmission processing unit 207 transmits the split mail 402 to the relay destination mail server 300 (step S406).

When the mail inspection processing unit 206 detects an irregularity or a threat related to e-mail, the split mail storage processing unit 203 outputs an abnormal response to the split mail detection processing unit 202. In this case, the split mail storage processing unit 203 does not output the final fragment to the mail transmission processing unit 207.

When the split mail detection processing unit 202 receives an abnormal response from the split mail storage processing unit 203, the split mail detection processing unit 202 notifies the mail reception processing unit 201 of the abnormality. The mail reception processing unit 201 responds to the relay source mail server 100 with permanent receipt rejection.

Next, the effects of the first example embodiment of the mail relay device will be explained.

In this example embodiment, when the mail relay device 200 receives a split mail, the mail relay device 200 transmits the received split mail to the relay destination mail server, thereby suppressing delays in e-mail delivery. In addition, the mail relay device 200 temporarily stores the received split e-mails. Then, when the mail relay device 200 receives the final fragment, the mail relay device 200 inspects the reassembled e-mail by merging all fragments. When the mail relay device 200 detects any irregularity or threat through the inspection, the mail relay device 200 does not transmit the final fragment to the relay destination mail server. Since the mail relay device 200 inspects the reassembled e-mail, i.e., the entire e-mail, the effectiveness of the e-mail inspection is increased.

Example Embodiment 2

The mail relay device of the second example embodiment transmits the results of the e-mail inspection to the relay destination mail server.

FIG. 5 is a block diagram showing an example of the mail relay device 210 in this example embodiment together with the relay source mail server 100 and the relay destination mail server 300. The mail relay device 210 includes a mail reception processing unit 201, a split mail detection processing unit 202, a split mail storage processing unit 203, a fragment temporary storage 204, a split mail merge processing unit 205, a mail inspection processing unit 206, a mail transmission processing unit 207, and error notification transmission processing unit 208.

When the mail inspection processing unit 206 detects an abnormality in the inspection results, the error notification transmission processing unit 208 transmits a warning mail indicating an alert, etc., as illustrated in FIG. 7 to the relay destination mail server 300.

The configuration of the mail relay device 210 other than the error notification transmission processing unit 208 is the same as that of the mail relay device 200 of the first example embodiment.

Next, the operation of the mail relay device 210 is explained with reference to the flowchart of FIG. 6. The processes from step S501 to step S506 in the second example embodiment are the same as those from step S401 to step S406 in the first example embodiment. In this example embodiment, the process of step S507 is added to the processes in the first example embodiment.

In this example embodiment, when the mail inspection processing unit 206 detects an irregularity or a threat related to an e-mail (step S505), the error notification transmission processing unit 208 transmits a warning mail with the contents illustrated in FIG. 7 to the relay destination mail server 300 (step S507).

In addition to the effects of the first example embodiment, the mail relay device 210 of the second example embodiment obtains such an effect as the mail relay device 210 can inform the relay destination mail server 300 that an unauthorized e-mail was transmitted or an e-mail containing a threat was about to be transmitted in order to call for attention.

Figure 8:
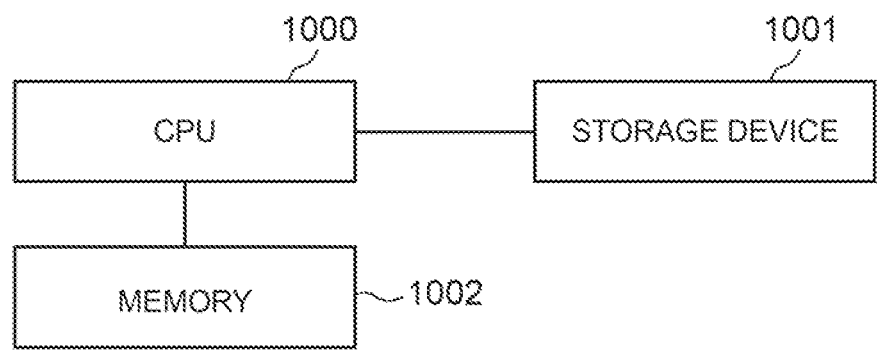
FIG. 8 It depicts a block diagram of an example of a computer with a CPU.

FIG. 8 is a block diagram of a computer with a CPU (Central Processing Unit). The computer is implemented in the mail relay device 200 or the mail relay device 210. The CPU 1000 executes processing according to the program (mail relay program) stored in the storage device 1001 to realize the functions in the above example embodiments. That is, the computer realizes the functions of the mail reception processing unit 201, the split mail detection processing unit 202, the split mail storage processing unit 203, the split mail merge processing unit 205, and the mail inspection processing unit 206 in the mail relay device 200 shown in FIG. 1. In addition, the CPU 1000 realizes functions of the mail reception processing unit 201, the split mail detection processing unit 202, the split mail storage processing unit 203, the split mail merge processing unit 205, the mail inspection processing unit 206, and the mail transmission processing unit 207 in the mail relay device 210 shown in FIG. 5.

The storage device 1001 is, for example, a non-transitory computer readable medium. The non-transitory computer readable medium includes various types of tangible storage media. Specific examples of the non-transitory computer readable medium include magnetic storage media (for example, a hard disc), magneto-optical storage media (for example, magneto-optical disc), compact disc-read only memory (CD-ROM), compact disc-recordable (CD-R), compact disc-rewritable (CD-R/W), and a semiconductor memory (for example, mask ROM, programmable ROM (PROM), erasable PROM (EPROM), flash ROM).

The program may be stored in various types of transitory computer readable media. The transitory computer readable medium is supplied with the program through, for example, a wired or wireless communication channel, or, through electric signals, optical signals, or electromagnetic waves.

The memory 1002 is a storage means implemented by a RAM (Random Access Memory), for example, and temporarily stores data when the CPU 1000 executes processing. It can be assumed that a program held in the storage device 1001 or a temporary computer readable medium is transferred to the memory 1002 and the CPU 1000 executes processing based on the program in the memory 1002. The fragment temporary storage 204 shown in FIGS. 1 and 5 can be realized by the memory 1002.

Figure 9:
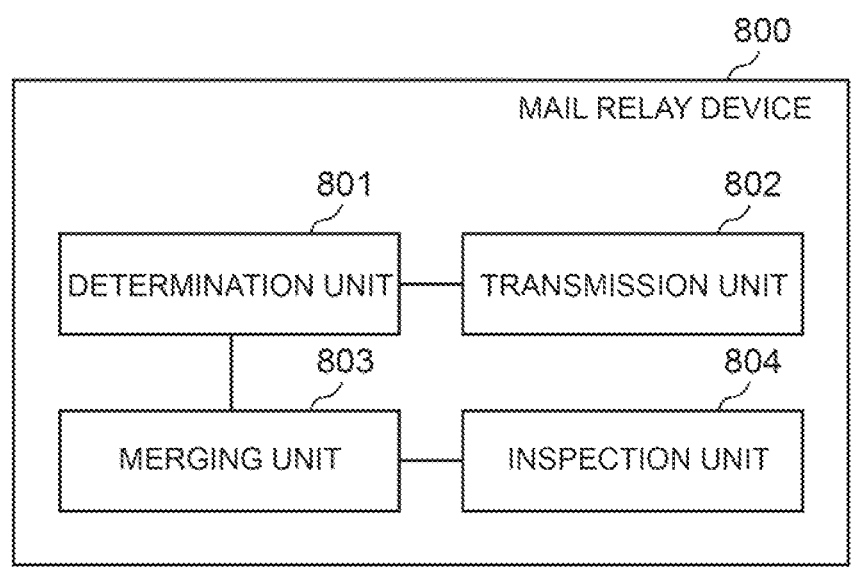
FIG. 9 It depicts a block diagram of the main part of the mail relay device.

Next, an overview of the present invention will be explained. FIG. 9 is a block diagram showing the main part of a mail relay device according to the invention. The mail relay device 800 (for example, mail relay device 200) comprises a determination unit 801 (in the example embodiments, realized in the split mail storage processing unit 203) which determines whether or not a received fragment is the last fragment to be received when any of a plurality of fragments generated by splitting an e-mail is received from a transmitting device, a transmission unit 802 (in the example embodiments, realized by the mail transmission processing unit 203) which transmits the fragment to a receiving device when the determination unit 801 determines that the received fragment is not a final fragment, a merging unit 803 (in the example embodiments, realized by the split mail merge processing unit 205) which merges all fragments forming the e-mail to reassemble e-mail when the determination unit 801 determines that the received fragment is the final fragment, and an inspection unit which inspects the e-mail reassembled by the merging unit 803 (in the example embodiments, realized by the mail inspection processing unit 206), wherein the transmission unit 802 transmits the final fragment to the transmitting device under the condition that the inspection unit 804 determines that the e-mail is normal.

A part of or all of the above example embodiments may also be described as, but not limited to, the following supplementary notes.

(Supplementary note 1) A mail relay device that relays e-mails, comprising
    determination means (in the example embodiments, realized by the split mail storage processing unit 203) for determining whether or not a received fragment is the last fragment to be received when any of a plurality of fragments generated by splitting an e-mail is received from a transmitting device,
    transmission means (in the example embodiments, realized by the mail transmission processing unit 207) for transmitting the fragment to a receiving device when the determination means determines that the received fragment is not a final fragment,
    merging means (in the example embodiments, realized by the split mail merge processing unit 205) for merging all fragments forming the e-mail to reassemble e-mail when the determination means determines that the received fragment is the final fragment, and
    inspection means (in the example embodiments, realized by the mail inspection processing unit 206) for inspecting the e-mail reassembled by the merging means,
    wherein the transmission means transmits the final fragment to the transmitting device under the condition that the inspection means determines that the e-mail is normal.

(Supplementary note 2) The mail relay device according to Supplementary note 1, further comprising
    storage means (in the example embodiments, realized by the fragment temporary storage 204) for storing the received fragments,
    wherein the merging means merges fragments having the same message ID among the fragments stored in the storage means.

(Supplementary note 3) The mail relay device according to Supplementary note 2, wherein
    the merging means merges the fragments in the order of the serial numbers set in a header of the fragments.

(Supplementary note 4) The mail relay device according to any one of Supplementary notes 1 to 3, wherein
    the inspection means at least checks whether the e-mail includes a threat or not.

(Supplementary note 5) The mail relay device according to any one of Supplementary notes 1 to 4, further comprising
    warning means (in the example embodiments, realized by the error notification transmission processing unit 208) for transmitting a warning mail to the receiving device when the inspection means determines that the e-mail is not normal.

(Supplementary note 6) The mail relay device according to any one of Supplementary notes 1 to 5, further comprising
    response means (in the example embodiments, realized in the mail reception processing unit 201) for making a response indicating the e-mail is not normal when the inspection means determines that the e-mail is not normal.

(Supplementary note 7) A mail relay method that relays e-mails, comprising
    determining whether or not a received fragment is the last fragment to be received when any of a plurality of fragments generated by splitting an e-mail is received from a transmitting device, transmitting the fragment to a receiving device when determining that the received fragment is not a final fragment, merging all fragments forming the e-mail to reassemble e-mail when determining that the received fragment is the final fragment, and inspecting the reassembled e-mail, wherein the final fragment is transmitted to the transmitting device under the condition that the e-mail is determined to be normal.

(Supplementary note 8) The mail relay method according to Supplementary note 7, further comprising storing the received fragments in storage means, wherein fragments having the same message ID among the fragments stored in the storage means are merged.

(Supplementary note 9) The mail relay method according to Supplementary note 8, wherein the fragments are merged in the order of the serial numbers set in a header of the fragments.

(Supplementary note 10) A mail relay program causing a computer to execute:

a determination process of determining whether or not a received fragment is the last fragment to be received when any of a plurality of fragments generated by splitting an e-mail is received from a transmitting device, a transmission process of transmitting the fragment to a receiving device when determining that the received fragment is not a final fragment, a merging process of merging all fragments forming the e-mail to reassemble e-mail when determining that the received fragment is the final fragment, and an inspection process of inspecting the reassembled e-mail, wherein the final fragment is transmitted to the transmitting device in the transmission process under the condition that the e-mail is determined to be normal.

(Supplementary note 11) The mail relay program according to Supplementary note 10, wherein the mail relay program further causes storing the received fragments in storage means, and merging fragments having the same message ID among the fragments stored in the storage means.

(Supplementary note 12) The mail relay program according to Supplementary note 11, wherein the mail relay program further causes merging the fragments in the order of the serial numbers set in a header of the fragments.

Although the invention of the present application has been described above with reference to the example embodiments and examples, the invention is not limited to the above example embodiments and examples. Various changes can be made to the configuration and details of the present invention that can be understood by those skilled in the art within the scope of the present invention.

This application claims priority based on Japanese Patent Application No. 2020-013730 filed on Jan. 30, 2020, the disclosure of which is incorporated herein in its entirety.

REFERENCE SIGNS LIST

100 Relay source mail server
200 Mail relay device
300 Relay destination mail server
201 Mail reception processing unit
202 Split mail detection processing unit
203 Split mail storage processing unit
204 Fragment temporary storage
205 Split mail merge processing unit
206 Mail inspection processing unit
207 Mail transmission processing unit
208 Error notification transmission processing unit
210 Mail relay device
800 Mail relay device
801 Determination unit t
802 Transmission unit
803 Merging unit
804 Inspection unit
1000 CPU
1001 Storage device
1002 Memory

What is claimed is:

1. A mail relay device that relays emails, comprising:
a memory storing instructions, and
one or more processors configured to execute the instructions to:
receive over time, from a transmitting device, a plurality of fragments of an email, the fragments generated by the transmitting device splitting the email, each fragment having a serial number indicating an order thereof in the email relative to other of the fragments;
when each fragment is received:
identify a most recently received fragment;
determine whether a number of the fragments that have thus far been received, including the most recently received fragment, is equal to a total number of the fragments of the email;
when the number of the fragments that have thus far been received is not equal to the total number of the fragments of the email, such that not all the fragments of the email have been received, transmit the most recently received fragment to a receiving device;
when the number of the fragments that have thus far been received is equal to the total number of the fragments of the email, such that all the fragments of the email have been received, and such that the most recently received fragment is a finally received fragment of the email:
merge all the fragments; that have been received in serial number order to reassemble the email, and inspect the reassembled email to determine whether or not the reassembled email contains a virus; and
transmit the finally received fragment to the receiving device, such that the finally received fragment is not transmitted to the receiving device, and such that not all the fragments of the email are transmitted to the receiving device, if the reassembled email contains the virus.

2. The mail relay device according to claim 1, wherein the email is a specific email of a plurality of emails that each have a message identifier,
the mail relay device further comprises a storage to store received fragments of all the plurality of emails, each received fragment including the message identifier of the email of which the received fragment is a part,
wherein the fragments having the message identifier of the specific email, are merged.

3. The mail relay device according to claim 1, wherein the reassembled email is inspected to further determine whether or not the reassembled email includes a threat other than the virus.

4. The mail relay device according to claim 1,
the one or more processors execute the software instructions to further, in response to determining that the reassembled email contains the virus, transmit a warning email to the receiving device that the email has been determined to contain the virus.

5. The mail relay device according to claim 1,
the one or more processors execute the software instructions to further, in response to determining that the reassembled email contains the virus, generate a response indicating the email has been determined to contain the virus.

6. A mail relay method that relays emails performed by a processor and comprising:
  receiving over time, from a transmitting device, a plurality of fragments of an email, the fragments generated by the transmitting device splitting the email, each fragment having a serial number indicating an order thereof in the email relative to other of the fragments;
  when each fragment is received:
    identifying a most recently received fragment;
    determining whether a number of the fragments that have thus far been received, including the most recently received fragment, is equal to a total number of the fragments of the email;
    when the number of the fragments that have thus far been received is not equal to the total number of the fragments of the email, such that not all the fragments of the email have been received, transmitting the most recently received fragment to a receiving device;
    when the number of the fragments that have thus far been received is equal to the total number of the fragments of the email, such that all the fragments of the email have been received, and such that the most recently received fragment is a finally received fragment of the email:
      merging all the fragments that have been received in serial number order to reassemble the email, and inspecting the reassembled email to determine whether or not the reassembled email contains a virus; and
      transmitting the finally received fragment to the receiving device, such that the finally received fragment is not transmitted to the receiving device, and such that not all the fragments of the email are transmitted to the receiving device, if the reassembled email contains the virus.

7. The mail relay method according to claim 6, wherein the email is a specific email of a plurality of emails that each have a message identifier,
  storing, in a storage, received fragments of all the plurality of emails, each received fragment including the message identifier of the email of which the received fragment is a part,
  wherein the fragments having the message identifier of the specific email are merged.

8. A non-transitory computer readable information recording medium storing a mail relay program executable by a computer to execute processing comprising:
  receiving over time, from a transmitting device, a plurality of fragments of an email, the fragments generated by the transmitting device splitting the email, each fragment having a serial number indicating an order thereof in the email relative to other of the fragments;
  when each fragment is received:
    identifying a most recently received fragment;
    determining whether a number of the fragments that have thus far been received, including the most recently received fragment, is equal to a total number of the fragments of the email;
    when the number of the fragments that have thus far been received is not equal to the total number of the fragments of the email, such that not all the fragments of the email have been received, transmitting the most recently received fragment to a receiving device;
    when the number of the fragments that have thus far been received is equal to the total number of the fragments of the email, such that all the fragments of the email have been received, and such that the most recently received fragment is a finally received fragment of the email:
      merging all the fragments that have been received in serial number order to reassemble the email, and inspecting the reassembled email to determine whether or not the reassembled email contains a virus; and
      transmitting the finally received fragment to the receiving device, such that the finally received fragment is not transmitted to the receiving device, and such that not all the fragments of the email are transmitted to the receiving device, if the reassembled email contains the virus.

* * * * *